(12) United States Patent
Mukasa et al.

(10) Patent No.: US 8,105,396 B2
(45) Date of Patent: Jan. 31, 2012

(54) NONAQUEOUS ELECTROLYTE SECONDARY BATTERY AND METHOD FOR FABRICATING THE SAME

(75) Inventors: Yasuhiko Mukasa, Kyoto (JP); Yoshiyuki Muraoka, Osaka (JP)

(73) Assignee: Panasonic Corporation, Osaka (JP)

( * ) Notice: Subject to any disclaimer, the term of this patent is extended or adjusted under 35 U.S.C. 154(b) by 39 days.

(21) Appl. No.: 12/528,589

(22) PCT Filed: Jan. 14, 2009

(86) PCT No.: PCT/JP2009/000104
§ 371 (c)(1),
(2), (4) Date: Aug. 25, 2009

(87) PCT Pub. No.: WO2010/082229
PCT Pub. Date: Jul. 22, 2010

(65) Prior Publication Data
US 2011/0008679 A1    Jan. 13, 2011

(51) Int. Cl.
*H01M 10/04* (2006.01)
*H01M 2/16* (2006.01)
*H01M 4/66* (2006.01)

(52) U.S. Cl. ........ 29/623.5; 429/129; 429/144; 429/245

(58) Field of Classification Search .................. 429/122, 429/128, 129, 209, 246, 144; 29/623.5
See application file for complete search history.

(56) References Cited

U.S. PATENT DOCUMENTS

| 2004/0072079 A1 | 4/2004 | Hashimoto et al. | |
|---|---|---|---|
| 2006/0141341 A1* | 6/2006 | Nishino et al. | 429/62 |
| 2007/0196738 A1* | 8/2007 | Ohata et al. | 429/246 |
| 2007/0292765 A1* | 12/2007 | Inoue et al. | 429/246 |
| 2008/0124628 A1 | 5/2008 | Inoue et al. | |
| 2008/0160412 A1 | 7/2008 | Kasamatsu et al. | |
| 2008/0199780 A1* | 8/2008 | Hayata et al. | 429/231.95 |

FOREIGN PATENT DOCUMENTS

JP        05-182692        7/1993
(Continued)

OTHER PUBLICATIONS

"Aluminum Alloys—Mechanical Properties" www.EngineeringToolBox.com (date unknown).*

(Continued)

*Primary Examiner* — Stephen J. Kalafut
(74) *Attorney, Agent, or Firm* — McDermott Will & Emery LLP

(57) ABSTRACT

A nonaqueous electrolyte secondary battery includes an electrode group 8 including a positive electrode 4 including a positive electrode current collector 4A and a positive electrode active material formed on the positive electrode current collector 4A, a negative electrode 5 including a negative electrode current collector 5A and a negative electrode active material formed on the negative electrode current collector 5A, and a porous insulating layer 6, the electrode group 8 being formed by winding or stacking the positive electrode 4 and the negative electrode 5 with the porous insulating layer 6 interposed. The positive electrode 4 has a tensile extension equal to or higher than 3.0%. The porous insulating layer 6 is made of a material containing aramid resin. Hence, even when the nonaqueous electrolyte secondary battery is destroyed by crush, occurrence of an internal short circuit in the battery can be prevented, thereby suppressing abnormal heat generation caused by an internal short circuit.

5 Claims, 3 Drawing Sheets

FOREIGN PATENT DOCUMENTS

| | | |
|---|---|---|
| JP | 07-105970 | 4/1995 |
| JP | 2000-058127 | 2/2000 |
| JP | 2000-100408 | 4/2000 |
| JP | 2000-323124 | 11/2000 |
| JP | 2001-297763 | 10/2001 |
| JP | 2003-068284 | 3/2003 |
| JP | 2003-142106 | 5/2003 |
| JP | 2004-349146 | 12/2004 |
| JP | 2006-134762 | 5/2006 |
| JP | 2006-190691 | 7/2006 |
| JP | 2006-294597 | 10/2006 |
| JP | 2008-135262 | 6/2008 |
| JP | 2008-186704 | 8/2008 |
| JP | 2008-288112 | 11/2008 |

OTHER PUBLICATIONS

Japanese Notice of Reasons for Rejection, with English Translation, issued in Japanese Patent Application No. JP 2009-518667, mailed Jul. 28, 2009.

* cited by examiner (a)

(b)

NONAQUEOUS ELECTROLYTE SECONDARY BATTERY AND METHOD FOR FABRICATING THE SAME

RELATED APPLICATIONS

This application is the U.S. National Phase under 35 U.S.C. §371 of International Application No. PCT/JP2009/000104, filed on Jan. 14, 2009, the disclosure of which is incorporated by reference herein.

TECHNICAL FIELD

The present invention relates to nonaqueous electrolyte secondary batteries and methods for fabricating the batteries, and particularly relates to a nonaqueous electrolyte secondary battery capable of suppressing occurrence of an internal short circuit caused by crush and a method for fabricating such a battery.

BACKGROUND ART

To meet recent demands for use on vehicles or for employing DC power supplies for large tools, small and lightweight secondary batteries capable of performing rapid charge and large-current discharge have been required. Examples of typical batteries satisfying such demands include a nonaqueous electrolyte secondary battery employing a material capable of inserting and extracting lithium ions, such as carbon, as a negative electrode active material, a material reversibly and electromechanically reacting with lithium ions, such as lithium cobaltate composite oxides, as a positive electrode active material, and an aprotic organic solvent in which lithium salt, such as $LiClO_4$ or $LiPF_6$, is dissolved, as an nonaqueous electrolyte.

Such a nonaqueous electrolyte secondary battery (hereinafter simply referred to as a "battery") has a configuration in which an electrode group is housed in a battery case together with an electrolyte, and an opening part of the battery case is sealed with a sealing plate, the electrode group being formed by winding or stacking, with a separator (a porous insulating layer) interposed, a positive electrode including a positive electrode current collector on which a positive electrode active material is formed and a negative electrode including a negative electrode current collector on which a negative electrode active material is formed.

Incidentally, occurrence of an internal short circuit in the nonaqueous electrolyte secondary battery causes current to flow in the battery, resulting in a temperature rise in the battery. Factors in occurring an internal short circuit may vary. Particularly, destruction by crash of a battery immediately causes a large current flow, resulting in a rapid temperature rise in the battery.

In general, a porous insulating layer (e.g., a polyolefin layer) used as a separator has a so-called shutdown function, a function of allowing no current to flow by becoming nonporous when the temperature in the battery becomes high due to a temperature rise by an internal short circuit. However, severe heat generation may melt and shrink the porous insulating layer to expand a portion where a short circuit occurs. Hence, suppression of abnormal heat generation is difficult.

In view of this, Patent Literature 1 discloses, as a method for suppressing such abnormal heat generation, the use of a separator in a layered structure of a porous insulating layer having the conventional shutdown function and a heat-resistant porous insulating layer (e.g., a polyimide layer, an aramid layer, etc.). A separator having such a layered structure can maintain the inherent shutdown function, and can prevent expansion of a portion where a short circuit occurs through the heat-resistant porous insulating layer when the shutdown function does not work by severe heat generation, thereby suppressing abnormal heat generation.

Further, Patent Literature 2 discloses a method for suppressing abnormal heat generation, in which the resistivity of a positive electrode active material is increased to suppress the magnitude of short circuit current flowing at an internal short circuit.

Patent Document 1: Japanese Unexamined Patent Application Publication No. 2000-100408
Patent Document 2: Japanese Unexamined Patent Application Publication No. 2001-297763
Patent Document 3: Japanese Unexamined Patent Application Publication No. 5-182692
Patent Document 4: Japanese Unexamined Patent Application Publication No. 7-105970

SUMMARY

Problems that the Invention is to Solve

All of the conventional methods for suppressing abnormal heat generation caused by an internal short circuit attempt to reduce the magnitude of short circuit current flowing at a short circuit upon occurrence of an internal short circuit, and provide no fundamental solution for preventing occurrence of an internal short circuit. Accordingly, abnormal heat generation may not be sufficiently suppressed depending on the degree of the internal short circuit. An enhancement of the advantage of reducing the magnitude of short circuit current may impair the intrinsic performance of a battery. For example, an increase in resistivity of a positive electrode active material lowers high rate discharge characteristics. Thus, the advantages of suppressing abnormal heat generation by the conventional methods have their limitations.

The present invention has been made in view of the foregoing, and its objective is to provide a nonaqueous electrolyte secondary battery excellent in safety in which no abnormal heat generation by an internal short circuit occurs by preventing occurrence of an internal short circuit in the nonaqueous electrolyte secondary battery even when the battery is broken by crush.

Means for Solving the Problems

A nonaqueous electrolyte secondary battery in accordance with the present invention includes an electrode group including a positive electrode including a positive electrode current collector and a positive electrode active material formed on the positive electrode current collector, a negative electrode including a negative electrode current collector and a negative electrode active material formed on the negative electrode current collector, and a porous insulating layer, the electrode group being formed by winding or stacking the positive electrode and the negative electrode with the porous insulating layer interposed, wherein the positive electrode has a tensile extension equal to or higher than 3.0%, and the porous insulating layer is made of a material containing aramid resin.

In the nonaqueous electrolyte secondary battery, the tensile c of the positive electrode is high. Accordingly, even when the nonaqueous electrolyte secondary battery is broken by crush, the positive electrode is not be broken, thus preventing occurrence of an internal short circuit in the battery. Additionally, the porous insulating layer is made of a material containing aramid resin having large friction force against the positive electrode. Fabrication process variations may result in a positive electrode having an insufficient tensile extension, which may result in breakage of the positive electrode by crush. However, even when the positive electrode is broken by crush, the porous insulating layer extends along with the broken positive electrode, so that the end part of the porous insulating layer can hold the position of the broken surface of the positive electrode. Consequently, the broken positive electrode can be prevented from reaching the negative electrode, thereby preventing occurrence of an internal short circuit.

Advantages of the Invention

According to the present invention, even when the nonaqueous electrolyte secondary battery is broken by crush, the positive electrode is not broken, thereby suppressing occurrence of an internal short circuit in the battery. Further, even when a positive electrode, which has an insufficient tensile extension due to fabrication process variations, is broken, the broken positive electrode does not reach the negative electrode, thereby suppressing occurrence of an internal short circuit in the battery. Hence, a nonaqueous electrolyte secondary battery excellent in safety in which no abnormal heat generation by an internal short circuit occurs can be provided.

Figure 1:
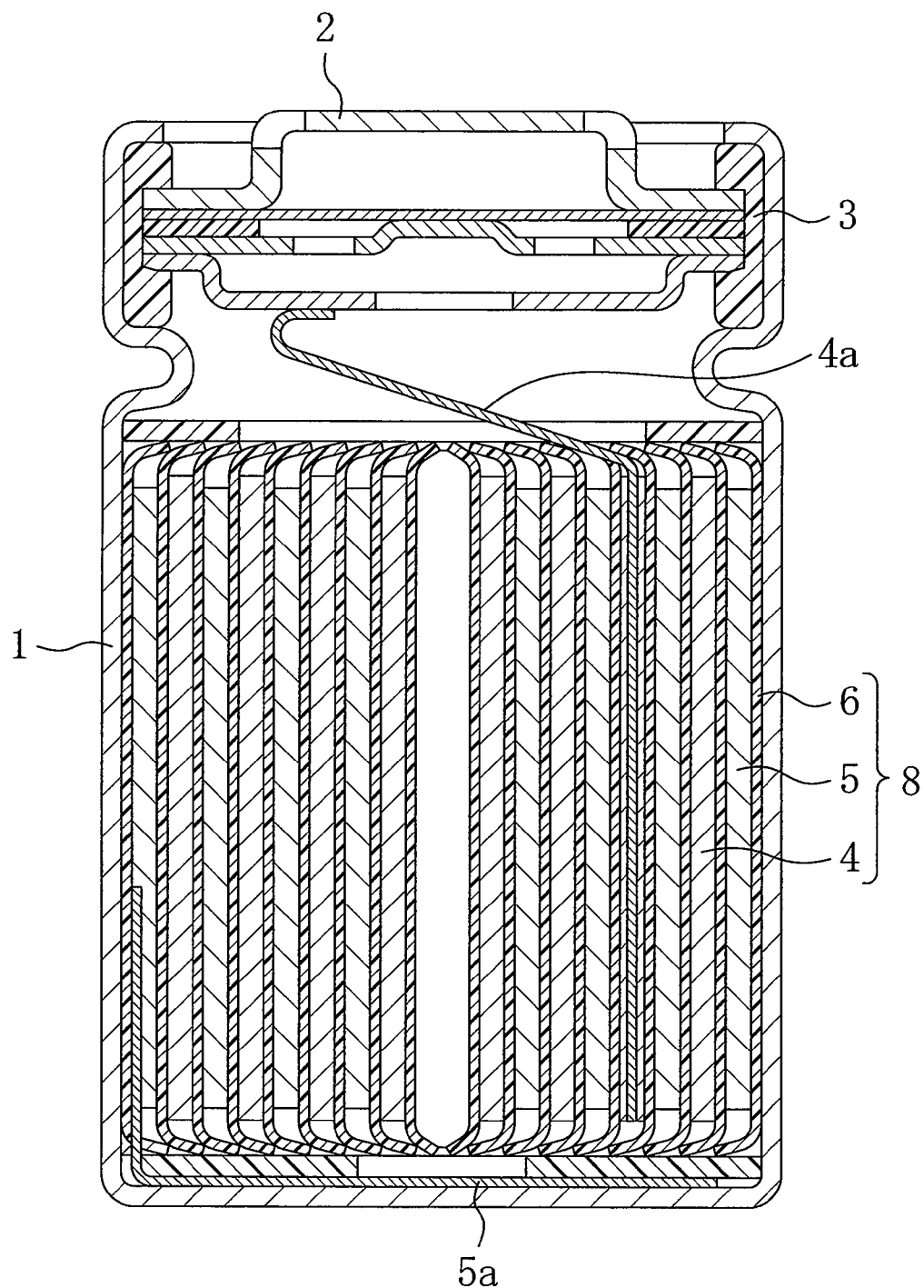
FIG. 1 is a cross-sectional view showing a configuration of a nonaqueous electrolyte secondary battery in one example embodiment of the present invention.

| DESCRIPTION OF CHARACTERS | |
|---|---|
| 1 | battery casing |
| 2 | sealing plate |
| 3 | gasket |
| 4 | positive electrode |
| 4A | positive electrode current collector |
| 4B | positive electrode material mixture layer |
| 4a | positive electrode lead |
| 5 | negative electrode |
| 5A | negative electrode current collector |
| 5B | negative electrode material mixture layer |
| 5a | negative electrode lead |
| 6 | separator |
| 8 | electrode group |

BEST MODE FOR CARRYING OUT THE INVENTION

One of the present applicants examined factors that cause an internal short circuit in a nonaqueous electrolyte secondary battery upon destruction by crush of the battery, and found the followings. Of a positive electrode, a negative electrode, and a separator constituting an electrode group, the positive electrode, which has the lowest tensile extension, is broken first. Then, the broken portion of the positive electrode pierces through the separator, resulting in that the positive electrode and the negative electrode are short-circuited.

In view of this, one of the present applicants extensively examined a method for increasing the tensile extension of a positive electrode, and found that when a positive electrode current collector on which a positive electrode material mixture layer is formed is rolled and then subjected to heat treatment at a predetermined temperature, an advantage of increasing the tensile extension of the positive electrode can be obtained. In general, after a positive electrode material mixture layer is formed onto a positive electrode current collector, heat treatment is performed for the purpose of increasing the adhesiveness between the positive electrode material mixture layer and the positive electrode current collector (see Patent Literatures 3 and 4, for example). However, while the heat treatment can increase the tensile extension of a positive electrode temporarily, rolling thereafter reduces back the tensile extension. Thus, the tensile extension of the positive electrode cannot be increased in the end.

On the basis of the foregoing knowledge, one of the present applicants discloses a method for suppressing occurrence of a short circuit in a nonaqueous electrolyte secondary buttery destroyed by crush by increasing the tensile extension of a positive electrode to a predetermined percentage or more, in the description of Japanese Patent Application No. 2007-323217 (corresponding to PCT/JP2008/002114).

Specifically, after positive electrode material mixture slurry containing a positive electrode active material is applied onto a positive electrode current collector and is dried, the positive electrode current collector coated with the dried positive electrode material mixture slurry is rolled, and the rolled positive electrode current collector is subjected to heat treatment at a predetermined temperature. This can increase the tensile extension of the positive electrode after rolling to 3.0% or more. Hence, the positive electrode is not broken first upon destruction by crush of the battery, thereby preventing occurrence of a short circuit in the battery.

The tensile extension of a positive electrode can be increased to 3.0% or more by heat treatment after rolling, as described above. This might be realized by the following mechanism.

That is, a positive electrode material mixture layer is formed on the surfaces of a positive electrode current collector, and therefore, the tensile extension of a positive electrode is not defined by only the inherent tensile extension of the positive electrode current collector itself. In general, the tensile extension of a positive electrode material mixture layer is lower than that of a positive electrode current collector. Accordingly, when a positive electrode not subjected to heat treatment after rolling is extended, the positive electrode is broken at the same time when a large crack occurs in the positive electrode material mixture layer. A factor of this is might be that a tensile stress in the positive electrode material mixture layer increases as the positive electrode is extended, and in turn, the increased tensile stress is applied intensively to a portion of the positive electrode current collector where the large crack occurs, thereby breaking the positive electrode current collector.

In contrast, when a positive electrode subjected to heat treatment after rolling is extended, while multiple minute cracks occur in a positive electrode material mixture layer, the positive electrode, in which a positive electrode current collector is softened, continues to extend. In the end, the positive electrode is broken. The factor of this might be as follows. Since a tensile stress applied to the positive electrode current collector is dispersed by occurrence of the multiple minute cracks, crack occurrence in the positive electrode material mixture layer less influences the current collector. Therefore, the positive electrode continues to extend up to a given length without being broken at the same time when the cracks occur. Then, the positive electrode current collector is broken at the time the tensile strength reaches a given value (a value approximate to the inherent tensile extension of the current collector).

The tensile extension of a positive electrode obtained by heat treatment after rolling varies depending on the materials of a positive electrode current collector and a positive electrode active material. In a case of, for example, a positive electrode in which a positive electrode material mixture layer containing $LiCoO_2$ as a positive electrode active material is formed on a positive electrode current collector made of aluminum, heat treatment at a temperature of 200° C. or higher (for 180 seconds) after rolling can increase the tensile extension of the positive electrode to 3% or more. Preferably, the temperature of the heat treatment is higher than the softening temperature of a positive electrode current collector and is lower than the decomposition temperature of a binder.

Table 1 is a table indicating results of a crush test performed on batteries fabricated using a positive electrode in which a positive electrode material mixture layer containing $CiCoO_2$ as a positive electrode active material is formed on a positive electrode current collector made of aluminum. Here, positive electrodes of Batteries 1 to 4 were subjected to heat treatment at a temperature of 280° C. for time periods of 10 seconds, 20 seconds, 120 seconds, and 180 seconds, respectively, after being rolling. Battery 5 is a battery not subjected to heat treatment after rolling.

TABLE 1

| | Heat treatment on positive electrode after rolling | | Tensile extension of positive | Crush test Depth at |
| --- | --- | --- | --- | --- |
| | Temperature (° C.) | Time period (second) | electrode after rolling (%) | short circuit (mm) |
| Battery 1 | 280 | 10 | 3.0 | 8 |
| Battery 2 | | 20 | 5.0 | 9 |
| Battery 3 | | 120 | 6.0 | 10 |
| Battery 4 | | 180 | 6.5 | 10 |
| Battery 5 | — | — | 1.5 | 5 |

As indicated in Table 1, it is understood that, while the tensile extension of the positive electrode of Battery 5 not subjected to heat treatment after rolling is 1.5%, the tensile extensions of the positive electrodes of Batteries 1 to 4 subjected to heat treatment after rolling are increased to 3 to 6.5%. The crash test on each of Batteries 1 to 5 (measurement of the amount of deformation (i.e., the depth at which a short circuit occurs) at the time a short circuit occurs by pushing a round stick having a diameter of 6 mm against the battery at a speed of 0.1 mm/sec) resulted in that, as indicated in Table 1, while the depth at which a short circuit occurs in Battery 5 not subjected to heat treatment after rolling is 5 mm, the depths at which a short circuit occurs in Batteries 1 to 4 subjected to heat treatment after rolling are increased to 8 to 10 mm. In other words, heat treatment after rolling can increase the tensile extension of a positive electrode to 3% or more, thereby preventing occurrence of a short circuit in a battery destroyed by crush.

High temperature or long time period of heat treatment after rolling may melt a binder contained in a positive electrode material mixture layer. If the positive electrode active material is covered with the binder thus melted, the battery capacity may reduce. The description of the aforementioned application discloses that it is preferable to use iron-containing aluminum as a material of a positive electrode current collector in order to prevent lowering of the battery capacity in association with heat treatment after rolling. The use of a positive electrode current collector made of iron-containing aluminum can reduce the temperature or time period of heat treatment after rolling which are necessary for obtaining a given tensile extension of a positive electrode. By doing so, lowering of the battery capacity in association with heat treatment after rolling can be prevented.

The present inventors fabricated nonaqueous electrolyte secondary batteries including a positive electrode whose tensile extension is increased to 3% or more by heat treatment after rolling, examined their safety in crush, and found that a given rate of positive electrodes are broken by crush to cause an internal short circuit in the batteries.

The tensile extension of a positive electrode can be controlled by adjusting conditions of heat treatment performed after rolling. Actually, however, various parameters influence the tensile extension of a positive electrode, such as the thickness of a positive electrode current collector, a ratio of a binder contained in a positive electrode material mixture layer, and the like, besides the conditions of the heat treatment. Such parameters can vary in the fabrication process, thereby resulting in undesired tensile extensions (e.g., lower than approximately 3%, for example) in some cases. The reason why an internal short circuit occurs by crush in the above batteries might be that, by such fabrication process variation, a desired tensile extension of the positive electrode cannot be obtained, and the positive electrode cannot have a tensile extension sufficient for crush, thereby causing breakage of the positive electrode.

In view of this, the present inventors examined a method for preventing occurrence of an internal short circuit even upon breakage of a positive electrode caused by insufficiency of the tensile extension of a positive electrode resulted from fabrication process variation, and reached the present invention.

One example embodiment of the present invention will be described below with reference to the drawings. The present invention is not limited to the following example embodiment. As to a configuration of nonaqueous electrolyte secondary batteries referred to in the present example embodiment, the configuration described in the description of the aforementioned application filed by the present applicant can be applied.

FIG. 1 is a cross-sectional view schematically showing a configuration of a nonaqueous electrolyte secondary battery in one example embodiment of the present invention.

As shown in FIG. 1, an electrode group 8, in which a positive electrode 4 and a negative electrode 5 are wound with a separator (a porous insulating layer) 6 interposed, is housed in a battery case 1 together with an electrolyte. An opening part 1a of the battery case 1 is sealed by a sealing plate 2 through a gasket 3. A positive electrode lead 4a attached to the positive electrode 4 is connected to the sealing plate 2 serving also as a positive electrode terminal. A negative electrode lead 5a attached to the negative electrode 5 is connected to the battery case 1 serving also as a negative electrode terminal.

Figure 2:
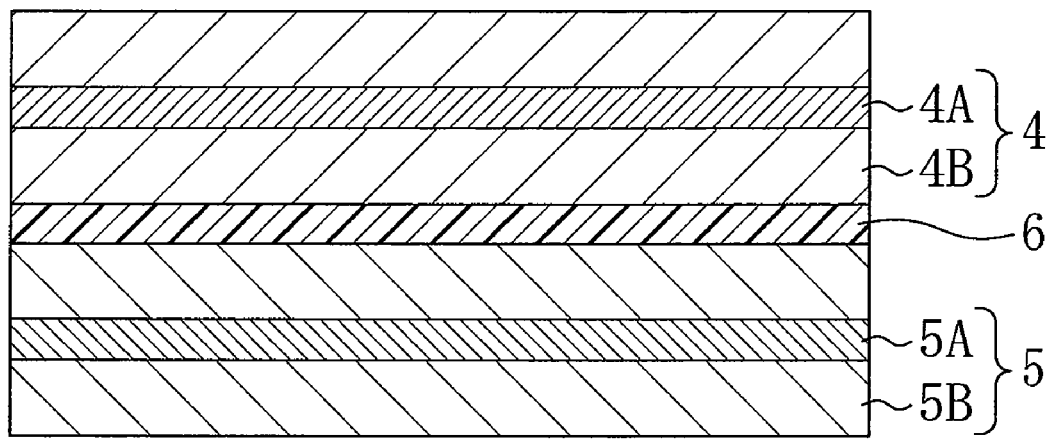
FIG. 2 is an enlarged cross-sectional view showing a configuration of an electrode group in accordance with one example embodiment of the present invention.

FIG. 2 is an enlarged cross-sectional view schematically showing a configuration of the electrode group 8 in the present example embodiment.

As shown in FIG. 2, positive electrode material mixture layers 4B are formed on opposite sides of a positive electrode current collector 4A. Negative electrode material mixture layers 5A are formed on opposite sides of negative a electrode current collector 5B. The separator 6 is interposed between the positive electrode 4 and the negative electrode 5.

Here, the tensile extension of the positive electrode 4 is equal to or higher than 3.0%. The separator 6 is made of a material containing aramid resin.

By setting the tensile extension of the positive electrode 4 to 3.0% or higher, even when the nonaqueous electrolyte secondary battery is broken by crush, the positive electrode 4 is not broken, thereby preventing occurrence of an internal short circuit in the battery. In addition, the separator 6 is made of a material containing aramid resin having large friction force against the positive electrode 4. Accordingly, even when a positive electrode 4 is broken because of its insufficient tensile extension (lower than 3.0%) resulted from fabrication process variation, the broken positive electrode 4 is prevented from reaching the positive electrode 5.

Here, the term, "tensile extension" in the present invention means an extension ratio of a sample piece at the time the sample piece is broken by pulling the sample piece. For example, an electrode plate having a width of 15 mm and including an effective part having a length of 20 mm is pulled at a speed of 20 mm/min, and then, the tensile extension is obtained from an extension ratio at the time the electrode plate is broken.

Next, a mechanism that can prevent the broken positive electrode 4 from reaching the negative electrode 5 by employing the separator 6 containing aramid resin will be described with reference to FIGS. 3(a) and 3(b).

Figure 3:
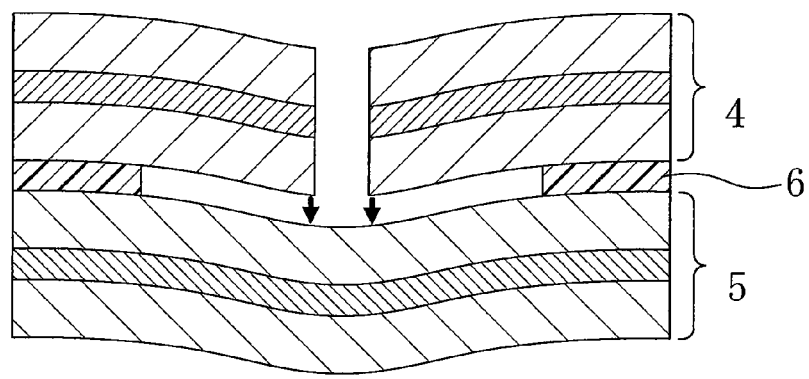
FIG. 3(*a*) is an illustration showing a state of a positive electrode broken by crush in the case where a separator containing no aramid resin is used, and FIG. 3(*b*) is an illustration showing a state of a positive electrode broken by crush in the case where a separator containing aramid resin is used.
Figure 3:
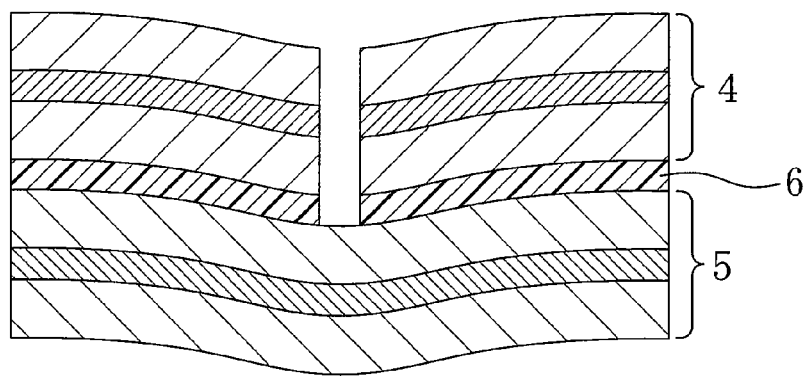

FIG. 3(a) is an illustration showing a state where the positive electrode 4 is broken by crush in the case where a separator 6 made a material not containing aramid resin (e.g., a polyolefin layer) is used. The conventional separator 6, which has low friction force against the positive electrode 4 and tends to slip, does not extend along with the broken positive electrode 4 to allow the broken positive electrode 4 to reach the negative electrode 5, resulting in an internal short circuit.

In contrast, FIG. 3(b) is an illustration showing a state where the positive electrode 4 is broken by crush in the case where the separator 6 made a material containing aramid resin is used. The separator 6, which has high friction force against the positive electrode 4, extends along with the broken positive electrode 4, so that the end parts of the separator can hold the position of the broken positive electrode 4. Thus, the broken positive electrode 4 is prevented from reaching the negative electrode 5, thereby preventing an internal short circuit from occurring.

Due to its excellent strength, aramid resin has been used conventionally in some cases as a material of a separator 6 that is hardly broken by external force. In contrast, the present invention has been made in view of the fact that the separator 6 made of a material containing aramid rein has high friction force against the positive electrode 4. Accordingly, the separator in the present invention is made of a material containing aramid resin to the extent that a given amount of friction force can be exhibited. In order to exhibit the above advantages more, it is preferable to use a separator made of a material containing aramid resin of 20 wt % or more (including a material containing only aramid resin). For maintaining the shutdown function of a separator, the use of aramid resin of 45 wt % or less is preferable.

Examples of the aramid resin include, for example, poly (paraphenylene-telephthalamide), poly(para benzamide), poly(4,4'-benzanilide terephthalamide), poly(paraphenylene-2,6-naphthalenedicarboxylic acid amide), poly(2-chloro-paraphenylene terephthalamide), poly phenylene terephthalamide/2,6-dichloro-paraphenylene terephthalamide, and the like.

The separator 6 may include a first separator made of the material containing aramid resin of the present invention, and a second separator having a shutdown function of becoming nonporous at high temperatures. With such a layered structure, even if the first separator is made of a material containing aramid resin of 45 wt % or more, an advantage that the shutdown function can be maintained by the second separator can be exhibited, in addition to the above advantages. In this case, the first separator must be in contact with the positive electrode 4 between the positive electrode 4 and the negative electrode 5. The second separator can be a separator made of polyolefin resin, such as polyethylene, polypropylene, and the like, for example. Further, the first separator may contain an inorganic material. Addition of an inorganic material can enhance the heat resistance of a heat-resistant layer (a layer containing aramid resin). Concrete examples of the inorganic material include alumina, magnesia, zirconia, titania, yttria, zeolite, silicon nitride, silicon carbide, and the like. Sole use or a combination of two or more of them may be applicable.

In the present invention, materials and formation methods of the positive electrode 4 and the negative electrode 5 constituting the electrode group 8 may be, but not limited particularly to, the followings. The electrode group 8 may be formed by not winding but stacking the positive electrode 4 and the negative electrode 5 with the separator 6 interposed.

The positive electrode current collector 4A may be made of aluminum, stainless steel, titan, or the like, for example. Particularly, the use of aluminum containing iron can reduce the temperature or time period of heat treatment after rolling of the positive electrode 4. The content of the iron in the positive electrode current collector 4A is preferably in the range from 1.20 to 1.70 wt %.

The positive electrode material mixture layer 4B may include a binder, a conductive agent, and the like in addition to the positive electrode active material. The positive electrode active material may be lithium composite metal oxide, for example. Typical examples of the oxide include $LiCoO_2$, $LiNiO_2$, $LiMnO_2$, $LiCoNiO_2$, and the like. Examples of the suitable material of the binder include, for example, poly (vinylidene fluoride) (PVDF), derivatives of PVDF, and rubber binders (e.g., fluororubber, acrylic rubber, and the like). Further, examples of material of the conductive agent include, for example, graphite, such as black lead, and carbon blacks, such as acetylene black.

The positive electrode 4 can be obtained by the following method. After positive electrode material mixture slurry containing the positive electrode active material is applied onto the positive electrode current collector 4A and is dried, the positive electrode current collector 4A coated with the dried positive electrode material mixture slurry is rolled, and then, the rolled positive electrode current collector 4A is subjected to heat treatment at a predetermined temperature. The conditions of the heat treatment after rolling is controlled so that the tensile extension of the positive electrode 4 is 3% or higher. However, when the tensile extension of the positive electrode 4 is higher than 10%, the positive electrode 4 is deformed in forming the electrode group 8 by winding, thereby involving difficulty in uniform winging. Hence, the tensile extension of the positive electrode 4 is preferably 10% or lower.

The negative electrode current collector 5A may be made of copper, stainless steel, nickel, or the like, for example. The negative electrode material mixture layer 5B may contain a binder, a conductive agent, and the like in addition to the negative electrode active material. Examples of material of the positive electrode active material include, for example, carbon materials, such as graphite and carbon fiber, and silicide, such as $SiO_x$.

The negative electrode 5 can be obtained in such a manner that, after negative electrode material mixture slurry containing the negative electrode active material is applied onto the negative electrode current collector 5A and is dried, the negative electrode current collector 5A coated with the dried negative electrode material mixture slurry is rolled.

It is noted that, in order to exhibit the advantages in the present invention, it is necessary to set the tensile extensions of the negative electrode 5 and the separator (a porous insulating layer) 6 to 3% or higher.

Description is given above of one preferred example embodiment of the present invention, of which description should not be taken as limitations, and various modifications can be made, of course. For example, the above example embodiment refers to a lithium ion secondary battery as an example of nonaqueous electrolyte secondary batteries, but the present invention is applicable to other nonaqueous electrolyte secondary batteries, such as a nickel hydrogen accumulator, within the scope that can exhibit the advantages of the present invention. Further, the present invention can exhibit the advantage of preventing occurrence of an internal short circuit by destruction by crush of a battery, but can also exhibit an advantage of preventing buckling of an electrode group or breakage of a positive electrode which are caused by swelling and shrinking of a negative electrode active material in association with charge/discharge of a battery.

INDUSTRIAL APPLICABILITY

The present invention is useful for nonaqueous electrolyte secondary batteries including an electrode group suitable for large-current discharge, and is applicable to, for example, drive batteries requiring high power output, such as electric power tools and electric vehicle, power supply batteries for large-capacity backup, batteries as secondary power supplies, and the like.

The invention claimed is:

1. A method for fabricating a nonaqueous electrolyte secondary battery having an electrode group including a positive electrode including a positive electrode current collector and a positive electrode active material formed on the positive electrode current collector, a negative electrode including a negative electrode current collector and a negative electrode active material formed on the negative electrode current collector, and a porous insulating layer, the electrode group being formed by winding or stacking the positive electrode and the negative electrode with the porous insulating layer interposed, wherein the positive electrode is formed by:
   coating the positive electrode current collector with positive electrode material mixture slurry containing the positive electrode active material, and drying the slurry;
   rolling the positive electrode current collector coated with the dried positive electrode material mixture slurry; and
   performing heat treatment on the rolled positive electrode current collector at 200° C. or more,
   the positive electrode has a tensile extension equal to or higher than 3.0%, and
   the porous insulating layer is made of a material containing aramid resin.

2. The method of claim 1, wherein the porous insulating layer includes a first porous insulating layer made of a material containing the aramid resin, and a second porous insulating layer having a shutdown function of becoming nonporous.

3. The method of claim 2, wherein the first porous insulating layer is in contact with the positive electrode between the positive electrode and the negative electrode.

4. The method of claim 1, wherein the positive electrode current collector is made of aluminum containing iron.

5. The method of claim 1, wherein the positive electrode current collector is made of aluminum containing iron in a range from 1.20 to 1.70 weight %.

* * * * *